United States Patent [19]
Borrini

[11] 3,754,413
[45] Aug. 28, 1973

[54] FRICTION CLUTCH
[75] Inventor: Bartolomeo Borrini, Ivrea, (Turin), Italy
[73] Assignee: Ing. C. Olivetti & C. S.p.A., Ivrea, Italy
[22] Filed: June 8, 1972
[21] Appl. No.: 260,798

[52] U.S. Cl. .................. 64/30 R, 192/55, 192/66
[51] Int. Cl. ............................................. F16d 7/02
[58] Field of Search ............... 192/55, 66; 64/30 R, 64/30 C

[56] References Cited
UNITED STATES PATENTS

| | | | |
|---|---|---|---|
| 3,213,645 | 10/1965 | Pease .................................. | 64/30 R |
| 3,327,819 | 6/1967 | Warwick ........................... | 64/30 R X |
| 2,631,708 | 3/1953 | Holstein ........................... | 64/30 R X |
| 2,884,104 | 4/1959 | Brochard ......................... | 64/30 C X |
| 1,820,749 | 8/1931 | Loeffler ........................... | 64/30 R X |
| 2,364,988 | 12/1944 | McFarland ........................ | 64/30 R X |

Primary Examiner—Allan D. Herrmann
Attorney—Kevin McMahon et al.

[57] ABSTRACT

A friction clutch includes a driving disk, a driven disk and an intermediate disk which is spring-coupled to the driving disk for imparting rotation thereto. The intermediate disk has a surface of friction material for gripping the driver disk when the latter is shifted into engagement with the former. The opposite face of the intermediate disk is provided with a plurality of inclined lugs at its periphery which mate with corresponding inclined lugs on the driving disk. Upon engagement of the clutch, the spring coupling and inclined lugs serve to create an exchange of forces for making the maximum transmissible value of torque independent of variations in the coefficient of friction between the coupled surfaces.

1 Claim, 5 Drawing Figures

FRICTION CLUTCH

CROSS-REFERENCE TO RELATED APPLICATION

Applicant claims priority from corresponding Italian patent application Ser. No. 69002-A/71, filed on June 11, 1971.

BACKGROUND OF THE INVENTION

1. Field of the Invention

The present invention relates to a friction clutch which is capable of transmitting a predeterminated value of torque in case the coefficient of friction of the clutch friction elements should vary.

2. DESCRIPTION OF THE PRIOR ART

As is known, friction clutches generally include a pair of disks, one of which is integral with a driving shaft and the other with a driven shaft, which disks can be brought into mutual contact through yieldable means, ordinarily being springs. When the clutch transmits torque, the springs apply forces to the disks having directions substantially coplanar with the axes of said shafts. Therefore, transmission of motion takes place owing to the tangential friction forces generated between the coupled surfaces of such disks by said forces.

The maximum torque transmissible by the clutch depends obviously on the value of the coefficient of friction between the coupled surfaces, as well as on the value of such forces. Since the value of the coefficient of friction in turn depends on the condition of the surfaces, the maximum torque transmissible by the clutch does not remain constant, inasmuch as it depends both on the evironmental conditions under which the clutch is operated (such as humidity, infiltration of extraneous substances between the contact surfaces) and on the condition of wear of the surfaces. In particular, infiltration of lubricant between the coupled surfaces of the clutch can produce variations in the coefficient of friction of over 100 percent; consequently the maximum transmissible torque under such conditions varies according to the same ratio compared with the projected theoretical value.

A principal object of the present invention is to provide a friction clutch which overcomes the disadvantages mentioned.

SUMMARY OF INVENTION

The clutch according to the invention, comprises at least a first driving disk and a second driven disk which is axially displaceable with respect to the first one and is characterized by the fact that located between said disks is a third disk which is connected to the first disk by yieldable means being deformable as a consequence of the rotation of the third disk, means being provided for applying an axial force to the third disk which force is substantially proportional to the difference between the force generated incidental to the deformation of the aforesaid yieldable means and the tangential force transmitted to the third disk by the second one when the two latter disks are brought into contact.

DETAILED DESCRIPTION

Figure 1:
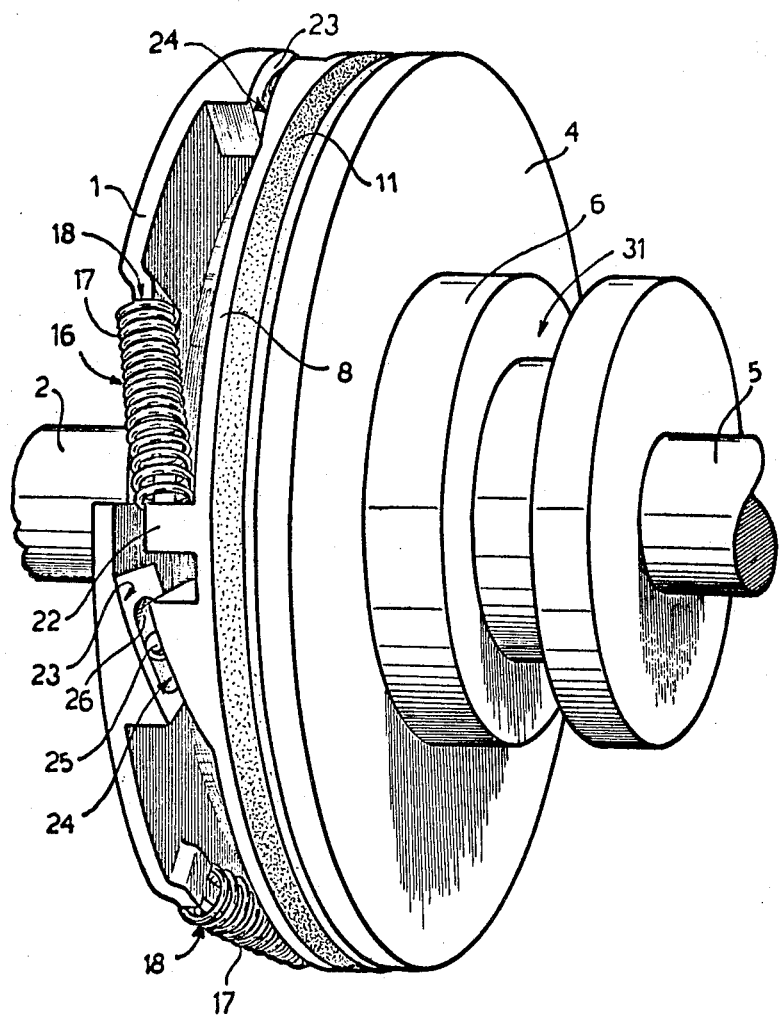
FIG. 1 is a perspective view of the friction clutch of the present invention.
Figure 2:
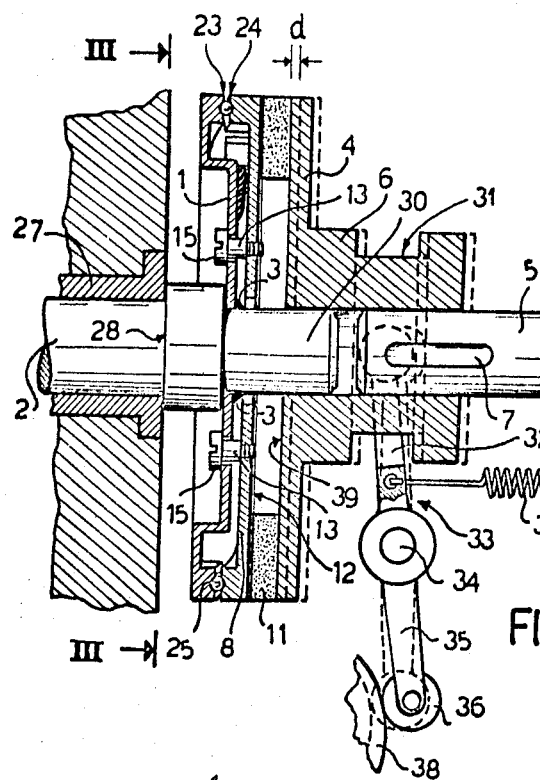
FIG. 2 is a vertical section of the clutch of FIG. 1 additionally showing the elements serving for control of said clutch.

Referring to FIGS. 1 and 2, the friction clutch of the invention comprises a driving disk 1 secured to a drive shaft 2 in any suitable manner, for example by means of a weld 3 (FIG. 2), and a driven disk 4 being torsionally integral with a driven shaft 5 and axially slidable with respect thereto. For effecting the aforesaid connection between the disk 4 and the shaft 5, there is provided in a portion of the hub 6 of said disk an axially extending groove (not shown) co-operating with a corresponding lug 7 accomodated in a shaft seat; the connection may also be effected by other means, for example through grooved coupling means.

An intermediate disk 8 (FIGS. 1 and 2) is located between the driving disk 1 and the driven disk 4 and is provided with a friction ring 11 secured to its surface 12 by any suitable means, for instance through adhesive means. The friction ring 11 may be made of cork material, compositions of the types used for automotive brake linings (ferodo) or any other material adapted to provide a suitable friction surface.

Figure 3:
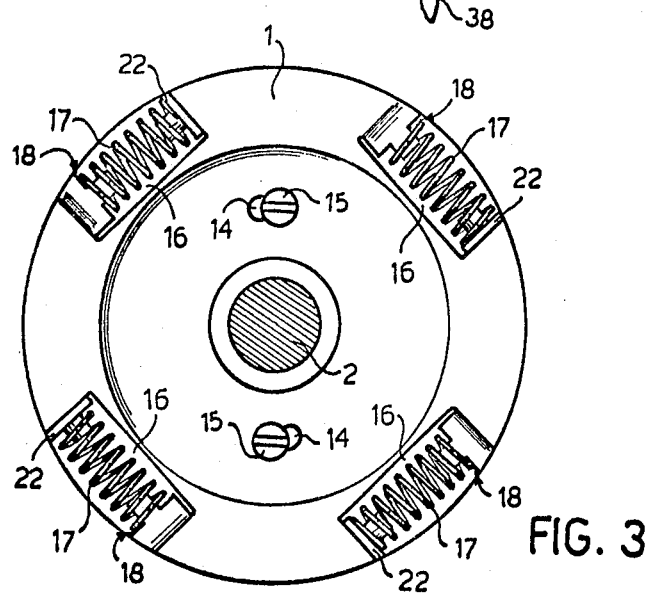
FIG. 3 is a vertical section of the clutch taken on a plane across III—III of FIG. 2.

The intermediate disk 8 is supported by the driving disk 1 through a set of pins 13 (FIG. 2) screwed into threaded holes of the first disk and co-operating with the corresponding slots 14 (FIG. 3) provided in the second disk. Owing to such assembly, the disk 8 is capable of executing both small (clockwise as seen in FIG. 3) rotations and, concurrently, small axial displacements with respect to disk 1. The pins 13 are suitably provided with a head 15 for permitting its assembly onto disk 8 and at the same time for acting as a stop means for the aforesaid relative axial displacement of said disk with respect to disk 1.

Provided in the driving disk 1 is a plurality of notches 16 (FIGS. 1 and 3) each of which accomodates therein a helical spring 17. One end of each spring 17 bears upon a shoulder 18 of the disk 1, while the other end bears on a corresponding projection 22 integral with the intermediate disk 8. The springs 17 are slightly preloadably mounted between the shoulders 18 and the projections 22.

Each spring 17 disposed in a plane which is substantially orthogonal to the axes of disks 1, 8 and 4, therefore tends to exert a tangential force on the projections 22 of disk 8 which rotates the latter counterclockwise with respect to the disk 1, as viewed in FIG. 1.

The driving disk 1 is also provided with a plurality of lugs 23 having inclined faces each being located on the peripheral portion of said disk between a pair of notches 16 and is intended to cooperate with a corresponding inclined-face lug 24 provided on the periphery of disk 8. Suitably assembled between each pair of lugs 23 and 25 is a rolling element in the form of a ball 25 for reducing friction during the relative rotation of disk 8 with respect to disk 1. The balls 25 are accomodated in raceways 26 in the form of elongated recesses for preventing the balls from leaving the raceways.

The shafts 2 and 5 are supported by suitable bearings one of which is identified in FIG. 2 as 27. The bearings, besides supporting the radial load operating on the shaft 2, also support the axial thrust transmitted by a shoulder 28 of said shaft when the clutch is in its coupled position said thrust being generated in a manner that will be explained below. In order to maintain disk 4 centered with respect to disk 1, the end 30 of shaft 2 extends inside the opening of hub 6 which also accomodates an end of shaft 5.

A fork of a lever 33 pivotable about pin 34 mounted on the clutch assembly frame cooperates with an annular groove 31 of the hub 6 portion. Rotatable on the end of the arm 35 of lever 33 is a roller 36 urged against a cam 38 by an extension spring 37; the cam having the object of controlling the engagement and disengagement of the clutch.

Figure 4:
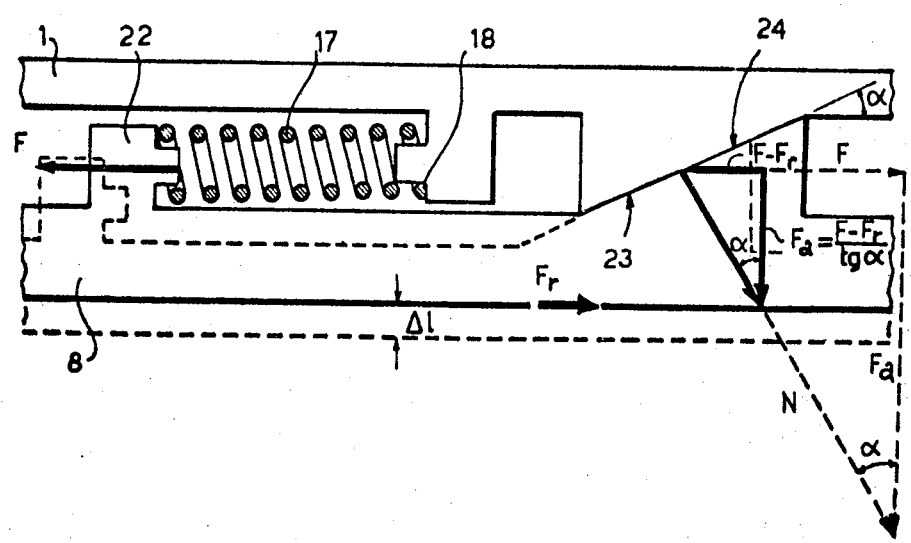
FIG. 4 is a fragmentary plan view of a portion of the clutch showing in schematic form some of the force vectors acting thereupon.

When the clutch is in its rest condition, the internal surface 39 (FIG. 2) of the driven disk 4 is located a short distance from the corresponding surface of friction ring 11, whereby disk 4 and hub 6 portion assume the position shown in FIG. 2 by a broken line. The disk 4 is held in the aforesaid position by lever 33, which assumes the position shown by the broken line by the action of spring 37 and the orientation of cam 38 which causes a corresponding displacement of the roller 36. Furthermore, owing to the preload by which the springs 17 are positioned, disk 8 lies at the end-of-travel position of its relative rotation with respect to the disk 1 (counterclockwise in FIG. 1, clockwise in FIG. 3). Such position, reached when pins 13 cooperate with the end portions of the slots 14 (FIG. 3), is shown in FIG. 4 by a broken line, in which figure is indicated a pair of inclined lugs 23 and 24 of associated disks 1 and 8, respectively. In FIG. 4, the disk 8 is shown located at the maximum distance from disk 1.

When lever 33 shifts counterclockwise on account of the rotation of cam 38 (FIG. 2), disk 4 is displaced leftwards by a corresponding amount. During the first portion of said displacement, the surface 39 of disk 4 is brought into contact with the corresponding surface of friction ring 11, while during the last portion of the same displacement disk 4 shifts disk 8 leftwards as well.

Assuming that the angle of incline of lugs 23 and 24 (FIG. 4) is equal to $\alpha$ with respect to the plane of the disks 1 and 8, the displacement $\Delta l$ corresponds to such (clockwise in FIG. 1) rotation of the disk 8 with respect to the disk 1, so as to reduce the free length of the springs 17 by an amount substantially equal to $\Delta l/\tan\alpha$.

The new position reached by disk 8 with respect to the 1 as a result of the displacement $\Delta l$ and the associated rotation is shown in FIG. 4 by a solid line.

Incidental to the increased compression of springs 17, a force F is generated. In order to maintain equilibrium of disk 8, corresponding to each force F applied to a projection 22 there is an equal and opposite reaction transmitted by the inclined lug 24 of disk 1 to the inclined lug 23 of the disk 8; said force F is shown in FIG. 4 by a broken line vector. If the inclined lugs 23 and 24 generate a reaction F, a force N is produced which is normal to their surfaces and is given by: $N=F/\sin\alpha$ the axial component of which, $F_a = N\cos\alpha = F/\tan\alpha$, axially loads disk 8. The various forces $F_a$ thus generated are transmitted to the disk 4 (FIG. 2) through the surface 39 thereof and the corresponding surface of the friction ring 11.

Supposing that shaft 2 is rotated, thereby driving both disk 1 integral therewith and disk 8 yieldably connected thereto by means of springs 17.

Disk 4 is also rotatably driven owing to the aforesaid axial forces $F_a$ which are transmitted between the surface 39 of disk 4 and the corresponding surface of ring 11. In fact, the forces $F_a$ produce tangential friction forces (not indicated on the drawings) on the contact plane of the previously mentioned surfaces capable of driving into rotation the disk 4 and of balancing the resisting moment $N_r$ applied to the shaft 5.

Said resisting moment, in turn, creates tangential forces $F_r$ (FIG. 4) on disk 8 having opposite directions to the previously mentioned forces F. Owing to the presence of $F_r$ the force transmitted by the inclined planes 23 and 24 decreases and, therefore, also decreases the value of $F_a$. In presence of force $F_r$, the triangle of forces (composed of the tangential, normal and axial forces that inclined planes 23 and 24 interchange) is modified in the way represented by the solid line in FIG. 4.

When $F_r$ becomes equal to F, force $F_a$ is annulled and, as a result, the clutch no longer transmits any torque.

The maximum torque transmissible by the clutch is therefore affected by the resisting moment $M_r$ acting thereon. The maximum transmissible moment occurs when the axial force $F_a$ (which depends on $M_r$) is capable of generating a transmissible moment equal to $M_r$.

In order to more clearly demonstrate how the maximum torque transmissible by the described clutch is substantially constant despite variations of the coefficient of friction between the coupled surfaces of disk 4 and friction ring 11, it is appropriate to analytical determine the value of said torque as follows.

As previously described, corresponding to the axial displacement $\Delta l$ there is a relative displacement (rightward in FIG. 4) of the projections 22 of disk 8 with respect to disk 1 which is equal to $\Delta l/\tan\alpha$. The spring 17 is therefore compressed, generating a force F equal to:

$$F = k\, \Delta l/\tan\alpha \qquad (1)$$

where $k$ is the spring constant, representing its rigidity.

A normal force N is therefore transmitted between the coupled surfaces of inclined lugs 23 and 24, the axial component $F_a$ whereof has the following value in the event that no resisting moment is applied onto the shaft 5 (FIG. 2):

$$F_a = F/\tan\alpha = K\, \Delta l/\tan^2\alpha \qquad (2)$$

The tangential force F, the normal force N and the axial force $F_a$ that each pair of inclined lugs 23 and 24 exchange is represented in FIG. 4 by the vectors shown as broken lines.

It is now assumed that applied onto the shaft 5 is a resisting moment $M_r$ (FIG. 1) originating tangential forces $F_r$ between the coupled surfaces of the friction ring 11 and the disk 4 of a value:

$$F_r = M_r/4R \qquad (3)$$

where $R$ is the radius to which said forces are applied, assumed coinciding with the forces F. Taking now into account the force $F_r$ which may be assumed as being applied on the disk 8 side shown in FIG. 4, the axial force $F_a$ obviously becomes:

$$F_a = F - F_r/\tan\alpha \qquad (4)$$

and thus indicating by $f$ the coefficient of friction existing between the coupled surfaces of the disk and the friction ring 11, and assuming that the mean radius of such coupled surfaces is equal to R, the maximum moment $M_t$ the clutch is capable of transmitting is:

$$M_t = (F - F_r)/\tan\alpha\ (f)\ (R) \qquad (5)$$

Such moment is equal to zero for $F_r = F$ and is equal to 4 $(F/\tan\alpha)\ (f)\ (R)$ when $F_r = 0$.

The tangential force $F - F_r$, normal force N, and axial force $F_a$ exchanged by each pair of inclined lugs 23, 24 in the presence of moment $M_r$, is displayed by the vectors shown in FIG. 4 by a solid line.

Figure 5:
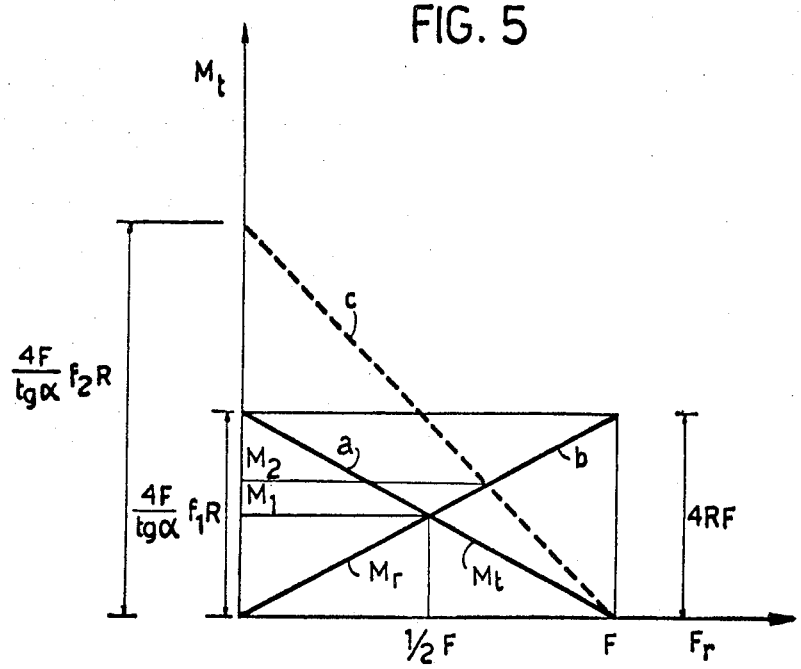
FIG. 5 is a graph showing some of the operational characteristics of the clutch of the invention.

FIG. 5 shows a graph of the transmissible moment $M_t$ computed by equation (5) when $F_r$ is varying assuming that $f = f_1$. The curve of said transmissible moment is a linear function and is shown in FIG. 5 by the solid straight line labeled $a$. Indicated in the same figure is the curve of the resisting moment $M_r$ as a function of $F_r$ supplied by equation (3); such curve is also a linear function and is labeled $b$.

If the clutch is dimensioned so that $f = \tan\alpha$ (as assumed for the straight lines of FIG. 4), it may be seen that the moment $M_t$ transmissible by the clutch is greater than $M_r$ for $F_r$ varying in the range from 0 to ½ F. The moment $M_t = M_1$ obtained at the intersection of straight lines $a$ and $b$ representing the maximum moment transmissible by the clutch when $f = f_1$. In fact, for the values $F_r <$ ½ $F$ the moment $M_t$ transmissible by the clutch is greater than the resisting moment $M_r$ acting thereon, while for values $F_r >$ ½ $F$ the situation is reversed and the coupled surface of disk 4 and ring 11 are sliding.

Assuming now that the coefficient of friction f is varied taking into consideration the condition where $f = f_2 = 2f_1$. The graph of the transmissible moment $M_t$ as a function of $F_r$ is now shown by the linear curve $c$ in FIG. 5. Under this condition, the transmissible moment defined by $M_2$ corresponds to the ordinate of the inspection of the linear curves $b$ and $c$. As seen from the figure, while the coefficient of friction is doubled the maximum moment transmissible by the clutch gains slightly with respect to the previous condition (approximately 20 percent).

Gains even smaller than those already indicated in the transmissible moment $M_t$, may be obtained with the same variation of the coefficient of friction by suitably choosing some geometric parameters of the clutch. In particular, the variation of the transmissible moment is very small for varying coefficients of friction if the slope of linear curves $a$ and $b$ is small with respect to the abscissa. The slope of said curves may be kept small by using both a low R value and a high F value, as can be seen from FIG. 5.

In addition to its function as a conventional clutch means, the described inventive clutch can also provide a safety coupling capable of transmitting a torque of predetermined value between two shafts of transmission means between which it is inserted. In this case disk 4 is assembled in such relative position with respect to disk 1 so as to deform the springs 17 by a predetermined amount. Used in this manner the linkage effected by the clutch is not disengaged, in comparison with the hitherto described mode of operation wherein engagement and disengagement of the clutch is achieved at any time by the axial displacement of disk 4 with respect to disk 1.

It is apparent that many changes and variations may be made to the embodiment described in the present specification without departing from the spirit and scope of the true invention, which is to be measured solely by the following claims.

I claim:

1. A friction clutch comprising a first driving disk and a second driven disk, one of said disks being displaceable relative to the other one, a third disk being disposed between said disks and having cemented friction material to the face toward said second disk, said third disk being yieldable connected to the first disk through a plurality of equally circumferentially spaced helical springs, each having the axis substantially orthogonal to the one of the disks, the ends of each of said springs bearing the one on a projection of said first disk and the other one on a corresponding projection of said third disk, said first disk having a plurality of equally circumferentially spaced inclined planes cooperating with corresponding inclined planes situated on said third disk with respect to the first one in such direction as to compress said springs when said third disk is displaced toward the first one.

* * * * *